United States Patent
Fujino et al.

(10) Patent No.: US 10,402,148 B2
(45) Date of Patent: Sep. 3, 2019

(54) MULTI-DISPLAY CONTROL APPARATUS, SYSTEMS, AND METHODS

(71) Applicant: LENOVO (Singapore) PTE. LTD., New Tech Park (SG)

(72) Inventors: Takane Fujino, Yokohama (JP); Keita Ishikawa, Yokohama (JP); Takayuki Suzuki, Yokohama (JP); Takehito Yamauchi, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/656,370

(22) Filed: Jul. 21, 2017

(65) Prior Publication Data

US 2018/0024806 A1 Jan. 25, 2018

(30) Foreign Application Priority Data

Jul. 25, 2016 (JP) ................................. 2016-145291

(51) Int. Cl.
*G06F 3/14* (2006.01)
*G09G 3/00* (2006.01)

(52) U.S. Cl.
CPC .......... *G06F 3/1454* (2013.01); *G06F 3/1423* (2013.01); *G09G 3/001* (2013.01); *G09G 2320/08* (2013.01); *G09G 2340/0492* (2013.01); *G09G 2354/00* (2013.01); *G09G 2358/00* (2013.01)

(58) Field of Classification Search
CPC ...... G06F 3/1454; G06F 3/1423; G06F 3/001; G09G 2320/08; G09G 2340/0492; G09G 2354/00; G09G 2358/00

USPC ....................................................... 345/1.1–4
See application file for complete search history.

(56) References Cited

U.S. PATENT DOCUMENTS

| 8,819,268 B1* | 8/2014 | Sauer .................. H04M 1/7253 709/232 |
| 2004/0255029 A1 | 12/2004 | Manion et al. |
| 2008/0052753 A1* | 2/2008 | Huang ............. H04N 21/41407 725/151 |
| 2008/0231546 A1* | 9/2008 | Li .......................... G06F 3/1423 345/3.4 |
| 2012/0060109 A1* | 3/2012 | Han ....................... G06F 3/1454 715/769 |
| 2014/0176393 A1 | 6/2014 | Endo et al. |
| 2015/0339005 A1 | 11/2015 | Li |
| 2017/0255442 A1* | 9/2017 | Kim .................... G06F 3/04883 |

FOREIGN PATENT DOCUMENTS

| EP | 2672376 A2 | 12/2013 |
| JP | 2004062177 A | 2/2004 |
| JP | 2004287160 A | 10/2004 |
| JP | 2008141375 A | 6/2008 |

(Continued)

*Primary Examiner* — Stephen G Sherman
(74) *Attorney, Agent, or Firm* — Kunzler Bean & Adamson

(57) ABSTRACT

A multi-display control apparatus includes a processor for an information handling device and a memory that stores code executable by the processor. The code is executable by the processor to detect a trigger event and, in response to detecting the trigger event, temporarily stopping display of content on a first display device in which the first display device is external to a second display device of a computing device storing the content.

20 Claims, 6 Drawing Sheets

(56) References Cited

FOREIGN PATENT DOCUMENTS

| | | |
|---|---|---|
| JP | 2009187500 A | 8/2009 |
| JP | 2010256392 A | 11/2010 |
| JP | 2013191207 A | 9/2013 |
| JP | 2015172623 A | 1/2015 |
| WO | 03/093967 A1 | 11/2003 |

* cited by examiner

MULTI-DISPLAY CONTROL APPARATUS, SYSTEMS, AND METHODS

CROSS-REFERENCE TO RELATED APPLICATIONS

This application claims priority to Japan Patent Application No. 2016-145291 filed on Jul. 25, 2016 for Fujino et al., the entire contents of which are incorporated herein by reference for all purposes.

FIELD

The various embodiments relate to multi-display control apparatus, systems, and methods.

BACKGROUND

In recent years, electronic presentations have been made using multiple display devices (e.g., monitors, etc.). In such cases, an operator giving the presentation connects an external display device, such as an external monitor or projector for an electronic device, such as a laptop personal computer (PC) carried by the operator and causes an external output device to display the screen content of the laptop PC by operating the laptop PC in, for example, a mirror display mode.

In some conventional electronic devices, such as computer equipment, an operating system for a multi-monitor system can be used to connect two or more display devices to one terminal so that the display devices can be used on the same system in case one display device is separated, which can be intended by a user. For example, Japanese Patent Application Publication No. 2004-62177 describes a multi-monitor display in which a small-screen display device is disposed on a side or upper surface of a large-screen display device so that the display screens of these display devices are driven by the same operating system.

In a case in which a multi-monitor setting of the laptop PC is the mirror display mode, for example, the screen content of the laptop PC can be unintentionally displayed on the external display device immediately after the external display device is connected to the laptop PC. Since screen contents of the laptop PC may include content that the operator does not want to be displayed on the external display device, the operator generally wants to quickly switch out of the multi-display mode. This switching operation, however, usually involves pressing a special key or the like, and is not currently known to users. Operation of a special key, in some cases, involves pressing an operation function key "Fn" as a special key and an F-number key (e.g., "F7") at the same time, and this pressing causes the multi-display mode to switch OFF.

Even when the multi-display mode switches OFF by operating the special key, if the mirror display mode has been selected, the display content of the laptop PC can be displayed on the external display device at least for a moment, and a screen content not intended by the operator is displayed on the external display device.

BRIEF SUMMARY

Various embodiments provide multi-display control apparatus. Further embodiments provide methods and computer program products related to such multi-display control apparatus.

In one embodiment, a multi-display control apparatus includes a processor of an information handling device and a memory that stores code executable by the processor. The code is executable by the processor to detect a trigger event and, in response to detecting the trigger event, temporarily stopping display of content on a first display device in which the first display device is external to a second display device of a computing device storing the content.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The technology disclosed herein is presented in view of the foregoing problems described in the Background section and provides an electronic device with a multi-monitor display control function that can ensure that the output of a computing device (e.g., a laptop personal computer (PC)) to an external display device connected to the computing device is the content intended for display by a user. Also provided are methods and computer program products that can ensure that the output of a computing device to an external display device connected to the computing device is the content intended for display by a user To solve at least some of the issues and to achieve various goals, one embodiment of a multi-display control apparatus includes a processor of an information handling device and a memory that stores code executable by the processor. The code is executable by the processor to detect a trigger event and, in response to detecting the trigger event, temporarily stopping display of content on a first display device in which the first display device is external to a second display device of a computing device storing the content. Multi-display control methods and computer program products to solve at least some of the issues and/or to achieve the various goals are also provided.

Figure 1:
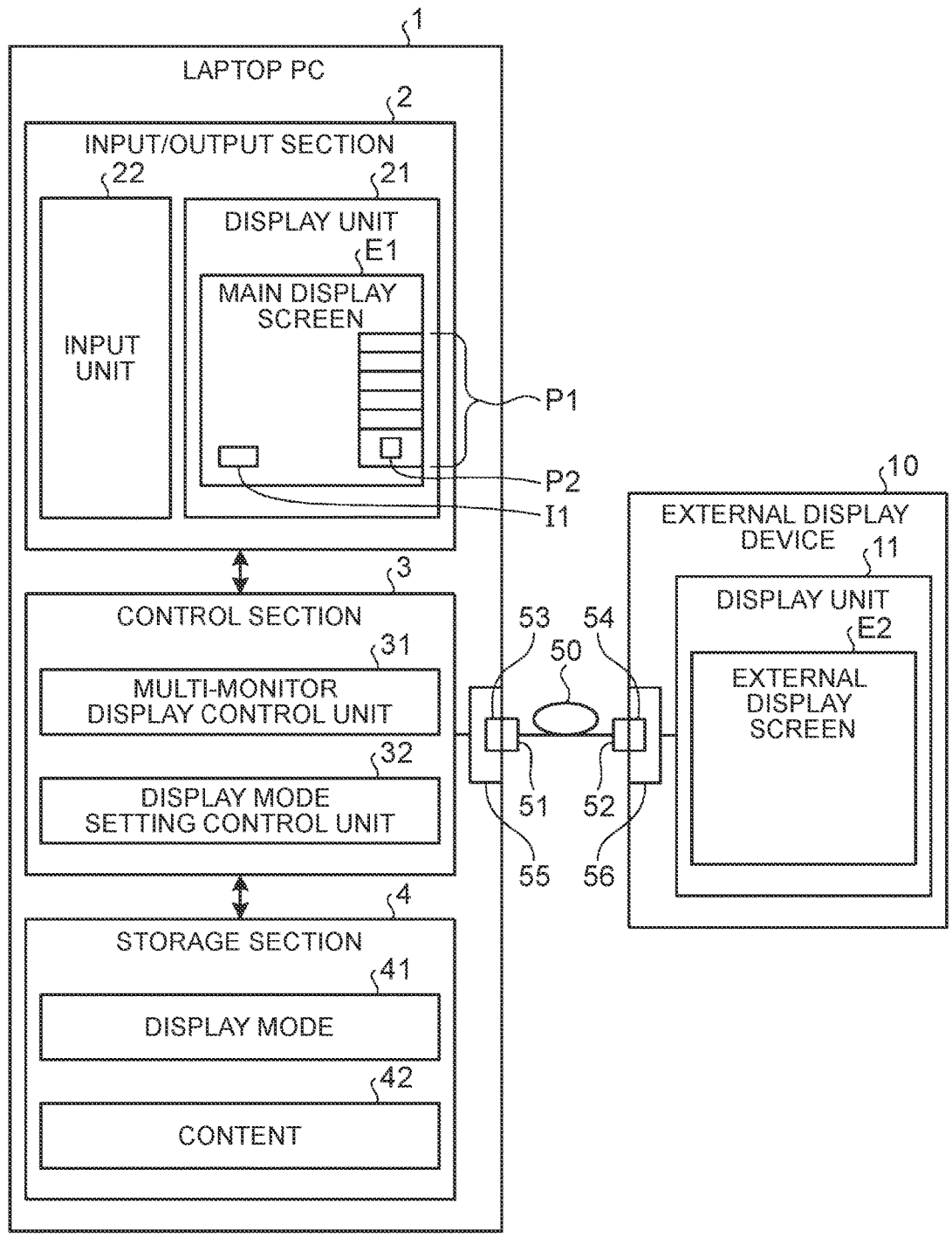
FIG. 1 is a block diagram illustrating one embodiment of a state in which an external display device is connected to a laptop personal computer (PC)

FIG. 1 is a block diagram illustrating one embodiment of a state in which an external display device 10 that is connected to a laptop PC 1. As illustrated in FIG. 1, the laptop PC 1 is connected to the external display device 10 using a video cable 50. The laptop PC 1 includes an input/output section 2, a control section 3, and a storage section 4.

The input/output section 2 includes a display unit 21 and an input unit 22. The display unit 21 includes a main display screen E1, which can be any type of display that is known (e.g., a liquid crystal display (LCD), etc.) or developed in the future. The input unit 22 can be, for example, a mouse, a keyboard, and/or a pointing device, etc., among other input devices that are possible and contemplated herein.

The external display device 10 includes a display unit 11. The display unit 11 includes an external display screen E2, which can be any type of display that is known (e.g., an LCD, etc.) or developed in the future. The external display device 10 and the laptop PC 1 are connected to each other using the video cable 50. The connected may be made in any manner including, for example, a plug 52 being inserted into a port 54 of a communication interface 56 of the external display device 10 and the plug 51 being inserted into a port 53 of a communication interface 55 of the laptop PC 1.

The control section 3 includes a multi-monitor display control unit 31 and a display mode setting control unit 32. The storage section 4 stores a display mode or setting for a multi-monitor display that has been previously used. The storage section 4 can further store content 42 for display on the main display screen E1 and/or the external display screen E2.

In accordance with various display modes, the multi-monitor display control unit 31 performs, on the main display screen E1 and/or the external display screen E2, multi-monitor display control and/or operations associated with the display modes. In a case in which the external display device 10 is connected to the laptop PC 1, the display mode setting control unit 32 can temporarily stop/pause the multi-monitor display control process on the main display screen E1 and/or the external display screen E2 by performing an interruption process on the multi-monitor display control unit 31. Additionally, or alternatively, the display mode setting control unit 32 can output a display of a display mode selection screen P1 for selecting a display mode of the multi-monitor display control process to the main display screen E1 and/or command the multi-monitor display control unit 31 to perform a multi-monitor display control process associated with the display mode selected on the display mode selection screen P1.

In some embodiments, the display mode selection screen P1 displays a checkbox P2 for inputting whether a setting of the selected display mode is saved or not. An icon (e.g., ID for displaying a display mode selection screen that can display the display mode selection screen P1 may be disposed on the main display screen E1 (e.g., on a lower left portion of the screen P1, among other locations that are possible and contemplated herein).

The various display modes can include a main display mode in which display is given on the main display screen E1, a mirror display mode in which the same content is displayed on the main display screen E1 and the external display screen E2, an extended display mode in which the external display screen E2 is used as a sub-display screen of the main display screen E1, and an external display mode, as a second screen mode, in which display is given on the external display screen E2.

Figure 2:
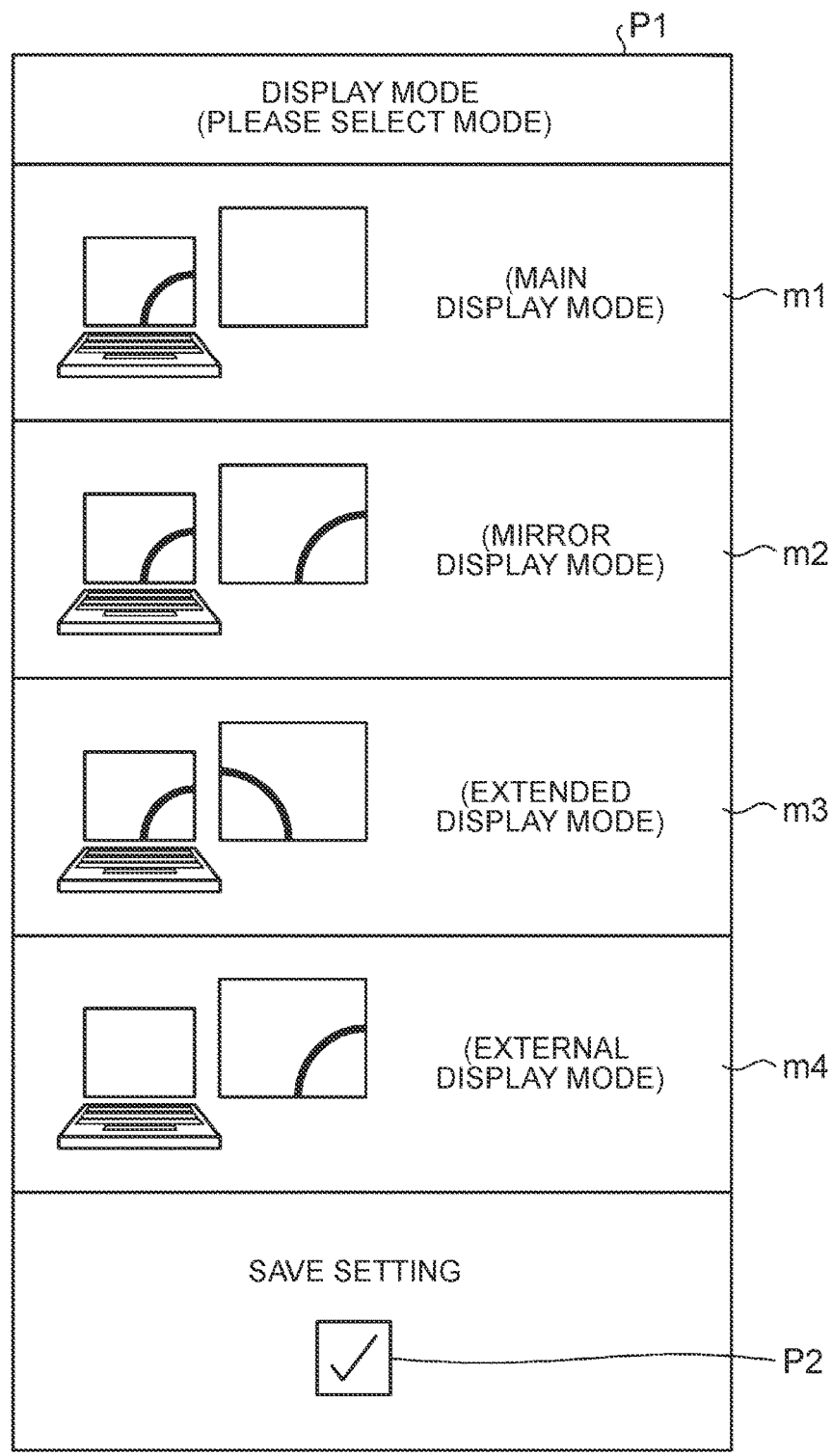
FIG. 2 is a view illustrating an embodiment of a display mode selection screen.

FIG. 2 is a view illustrating an embodiment of the display mode selection screen P1. As illustrated in FIG. 2, schematic graphical displays can be added to demonstrate the contents of a main display mode m1, a mirror display mode m2, an extended display mode m3, and an external display mode m4.

The communication interface 55 illustrated in FIG. 1 can include a connection detection section and/or function for detecting whether the plug 51 is connected to the port 53. In response to detecting a connection, the communication interface 55 can notify the control section 3 of the connection between the plug 51 and the port 53. In various embodiments, detection of connection between the plug 51 and the port 53 may be detection of a physical and/or software connection.

In the embodiment illustrated in FIG. 1, the laptop PC 1 and the external display device 10 are connected via a wire, but may be connected together wirelessly or both wired and wirelessly. In the case of a wireless or wired/wireless connection, at the time when communication between the communication interfaces 55 and 56 is established, the communication interface 55 notifies the control section 3 that the external display device 10 is connected. In some embodiments, a USB cable may replace the video cable 50, among other connection devices, technologies, and/or techniques that are possible and contemplated herein.

Figure 3:
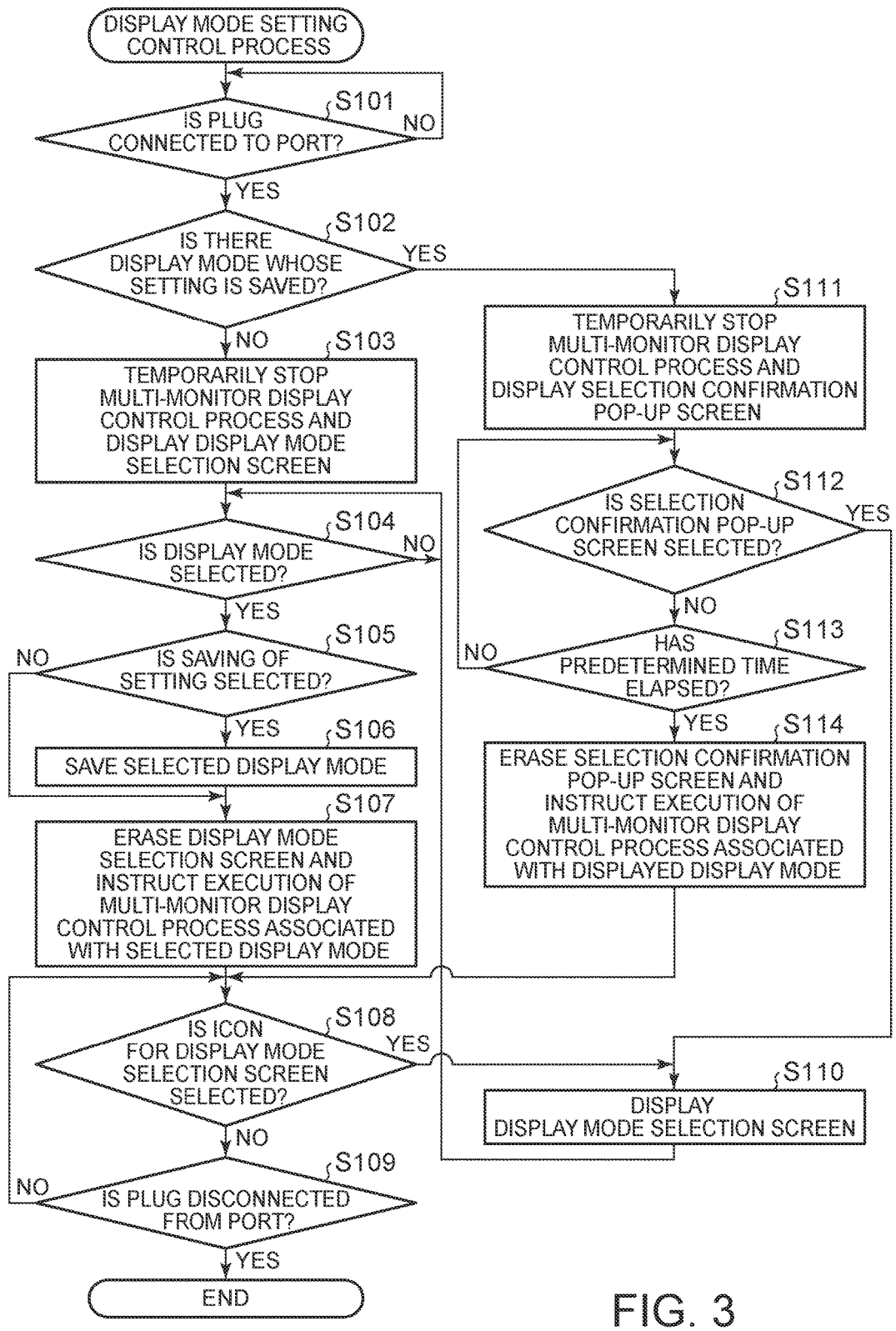
FIG. 3 is a flow diagram of one embodiment of a display mode setting control method performed by a display mode setting control unit.

With reference to FIG. 3, FIG. 3 is a flow diagram of one embodiment of a display mode setting control method performed by a display mode setting control unit 32. At least in the illustrated embodiment, the method begins by the display mode setting control unit 32 determining whether a plug 51 is connected to a port 53 (block S101). In response to the plug 51 not being connected to the port 53 (e.g., a NO in block S101), the determination process of block S101 is repeated.

On the other hand, in response to the plug 51 being connected to the port 53 (e.g., a YES in block S101), the display mode setting control unit 32 further determines whether there is a display mode 41 with a setting that is stored/saved in the storage section 4 (block S102). In response to a display mode 41 not being stored/saved in the storage section 4 and/or if no display mode 41 is provided and the display mode is in a default state (e.g., a NO in block S102), the display mode setting control unit 32 temporarily stops the multi-monitor display control process and further displays the display mode selection screen P1 (block S103).

The display mode setting control unit 32 may further determines whether a display mode is selected on the display mode selection screen P1 (block S104). In response to the display mode not being selected on the display mode selection screen P1 (e.g., a NO in block S104), the determination process of block S104 is repeated. On the other hand, in response to the display mode being selected on the display mode selection screen P1 (e.g., a YES in block S104), the display mode setting control unit 32 further determines whether a storage setting is saved via the checkbox P2 (block S105).

In response to the storage setting being saved (e.g., the checkbox P2 is checked) (e.g., a YES in block S105), the selected display mode setting is stored/saved in the storage section 4 (block S106). Further, the display mode selection screen P1 may be erased and an execution instruction of the multi-monitor display control process associated with the selected display mode can be issued to the multi-monitor display control unit 31 (block S107). On the other hand, the storage setting being saved (e.g., the checkbox P2 not being checked) (e.g., a NO in block S105), the method proceeds to block S107 and the operations of block S107 may be performed.

The display mode setting control unit 32 may further determine whether the icon I1 for the display mode selection screen is selected (block S108). In response to the icon I1 being selected (e.g., a YES in block S108), the display mode selection screen P1 is displayed (block S110) and the method returns to block S104. On the other hand, in response to the icon I1 not being selected (e.g., a NO in block S108), the display mode setting control unit 32 further determines whether the port 53 is disconnected from the plug 5 (block S109).

In response to the plug 51 not being disconnected from the port 53 (e.g., a NO in block S109), the method returns to step S108 and the processes described above may be repeated. On the other hand, in response to the plug 51 being disconnected from the port 53 (e.g., a YES in block S109), the method is completed.

Figure 4:
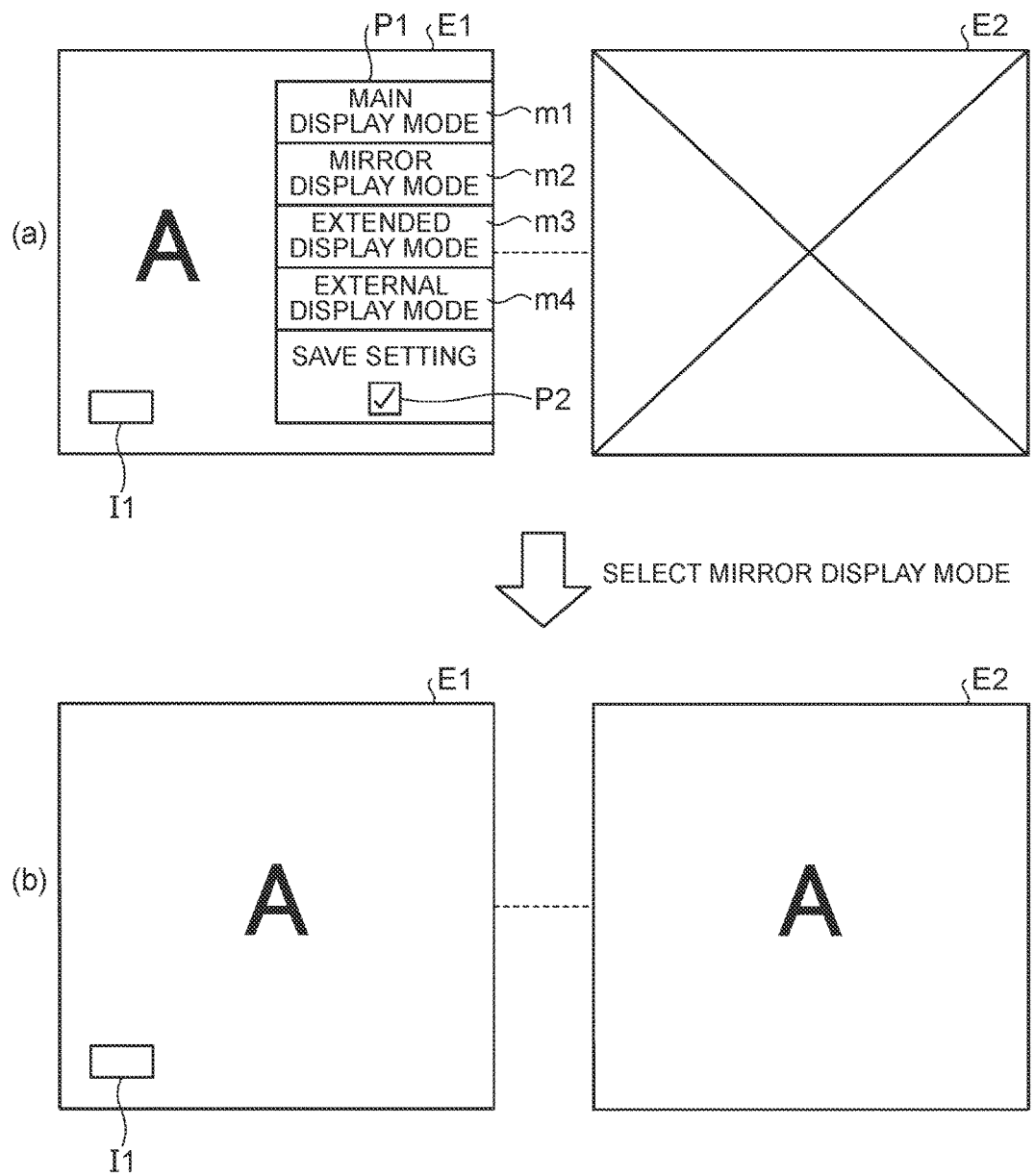
FIG. 4 is a view illustrating one embodiment of a display state of a main display screen and an external display screen when the external display device is connected, and a subsequent display state of the main display screen and the external display screen when a mirror display mode is selected.

As illustrated in section (a) of FIG. 4, in response to the external display device 10 being connected, the display mode setting control unit 32 displays the display mode selection screen P1 on a right portion of the main display screen E1, among other locations that are possible and contemplated herein. In this state, "A" is displayed on the main display screen E1, whereas nothing is displayed on the external display screen E2. Thereafter, as illustrated in section (b) of FIG. 4, in response to the mirror display mode being selected, "A" is displayed on each of the main display screen E1 and the external display screen E2 in accordance with the mirror display mode. In this manner, "A" on the main display screen E1 is not immediately and unintentionally displayed on the external display screen E2 at the time when the external display device 10 is connected to the laptop PC 1. That is, in the case of a display using the external display screen E2, the processes of displaying the display mode selection screen P1 and selecting a display mode are interposed so that an interval of time is given before "A" is displayed on the external display screen E2.

The process of placing an interval of time between displaying content can avoid occurrences of unintentional display of content on the external display screen E2. In addition, since the display mode selection screen P1 is displayed using a cable connection as a trigger event, a user can confidently perform a display operation, even if nothing is displayed on the external display screen E2 at the time of the cable connection.

With reference again to FIG. 3, in response to a display mode 41 storing/saving a setting (e.g., a YES in block S102), the display mode setting control unit 32 temporarily stops/pauses the multi-monitor display control process and displays a selection confirmation pop-up screen P3 (see e.g., FIG. 5) of encouraging confirmation of selection of the display mode 41 whose setting has been saved (block S111). As illustrated in section (a) of FIG. 5, for example, the selection confirmation pop-up screen P3 pops up a confirmation that the setting that the display mode 41 is currently storing/saving is the mirror display mode.

Subsequently, the display mode setting control unit 32 can determine whether selection of the selection confirmation pop-up screen P3 is performed (block S112). The selection confirmation pop-up screen P3 can show a "menu is displayed by clicking" message and, in response to selection of the selection confirmation pop-up screen P3 being performed (e.g., a YES in block S112), the display mode selection screen P1 is displayed instead of the selection confirmation pop-up screen P3 (block S110). For instance, if the selection confirmation pop-up screen P3 is selected, a new display mode is selected and set, instead of displaying content in the display mode that is currently set.

On the other hand, in response to selection of the selection confirmation pop-up screen P3 not being performed (e.g., a NO in block S112), the display mode setting control unit 32 determines whether a predetermined time, such as several seconds, has elapsed (block S113). In response to the predetermined time not being elapsed (e.g., a NO in block S113), the method returns to block S112. In response to the predetermined time elapsing (e.g., a YES in block S113), the selection confirmation pop-up screen P3 is erased and an execution instruction of the multi-monitor display control process associated with the displayed display mode is issued to the multi-monitor display control unit 31 (block S114) and the method returns to block S108.

Figure 5:
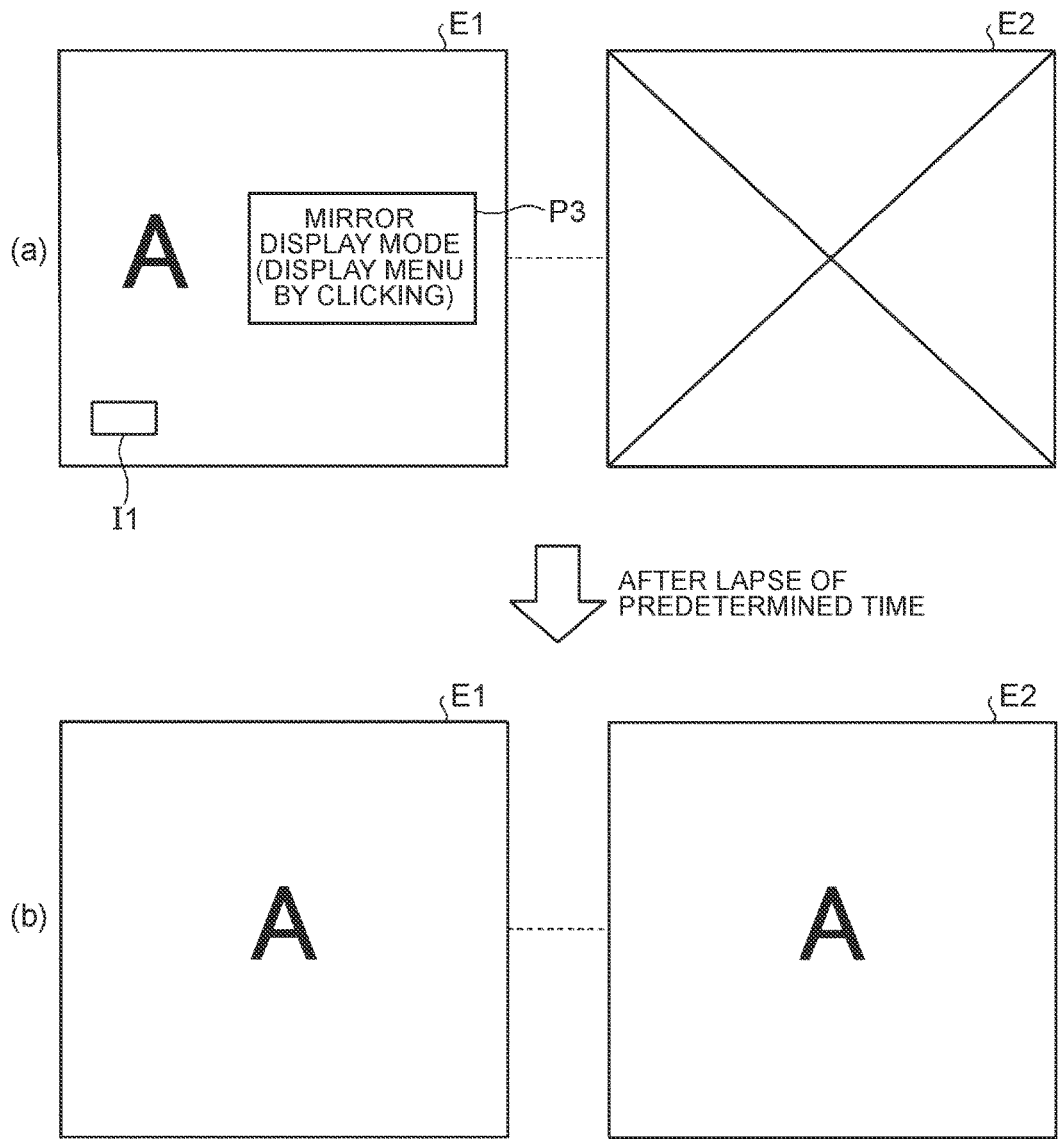
FIG. 5 is a view illustrating an embodiment of a display state of the main display screen and the external display screen when the external display device is connected with a display mode previously set, and a subsequent display state of the main display screen and the external display screen when the mirror display mode is selected.

As illustrated in section (a) of FIG. 5, in response to the display mode 41 being set, the selection confirmation pop-up screen P3 for confirmation of the set display mode is displayed on the main display screen E1 instead of the display mode selection screen P1, and nothing is displayed on the external display screen E2. Should an operator desire to execute the process in the displayed display mode, when the predetermined time has elapsed in the same state, "A" is displayed on each of the main display screen E1 and the external display screen E2 in the mirror display mode, for example, as illustrated in section (b) of FIG. 5. If the operator wants to change the mode to another display mode, the operator can select the selection confirmation pop-up screen P3 so that the display mode selection screen P1 is displayed.

Accordingly, even if the display mode is set at the mirror display mode at the time when the external display device 10 is connected to the laptop PC 1, the selection confirmation pop-up screen P3 is displayed until the predetermined time has elapsed and "A" on the main display screen E1 is not displayed on the external display screen E2. In this manner, "A" on the main display screen E1 is not immediately and unintentionally displayed on the external display screen E2 at the time when the external display device 10 is connected to the laptop PC 1.

For instance, in the case of a display using the external display screen E2, the process of displaying the selection confirmation pop-up screen P3 and a lapse of the predetermined time are interposed so that an interval of time elapses before display of content is provided on the external display screen E2 in response to a trigger event. A trigger event may be any suitable event that can occur prior to a user displaying content on the external display screen E2. For instance, a trigger event may include cable connection (e.g., a plug 52 being inserted into a port 54 of a communication interface 56 of the external display device 10 and/or a plug 51 being inserted into a port 53 of a communication interface 55 of the laptop PC 1, etc.), and/or detection of a peripheral device (e.g., a projector, external display screen E2, etc.), etc., among other events that are possible and contemplated herein.

The process of placing the interval of time between displaying the content on the main display screen E1 and the external display screen E2 can avoid or at least reduce occurrences of unintentional display on the external display screen E2. In addition, since the selection confirmation pop-up screen P3 is displayed using the cable connection as a trigger event, a user can feel comfort in performing a display operation even if nothing is displayed on the external display screen E2 at the time of the cable connection.

In the embodiments discussed above, the display mode selection screen P1, the selection confirmation pop-up screen P3, and the icon I1 can be displayed on the main display screen E1, but may also be displayed on the external display screen E2. That is, these displayed items may not cause a problem even when being displayed to a third party, such as a participant in a presentation. Accordingly, the display mode selection screen P1, the selection confirmation pop-up screen P3, and/or the icon I1 may be displayed on the external display screen E2.

Figure 6:
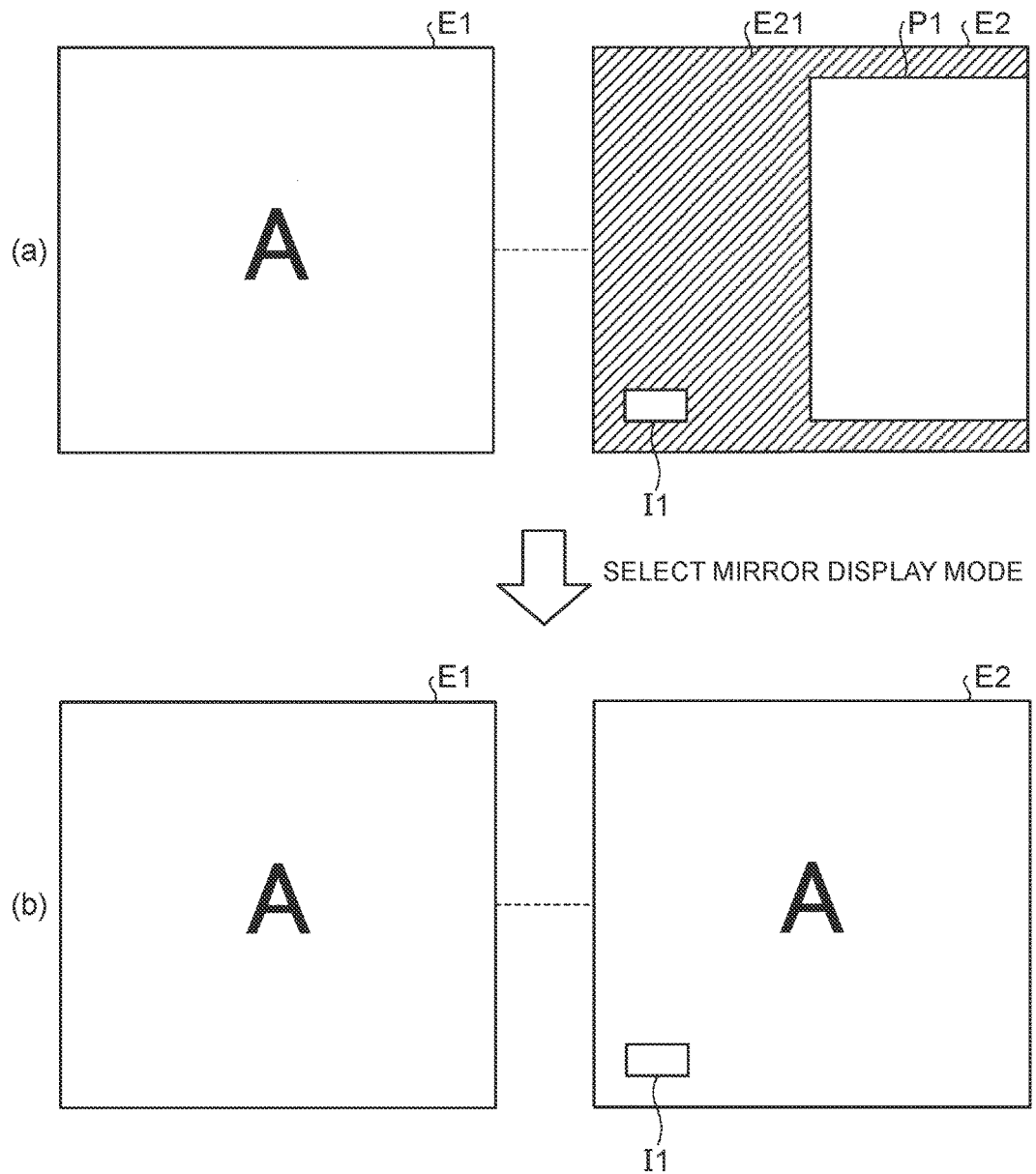
FIG. 6 is a view illustrating one embodiment in which a display mode selection screen is displayed on an external display screen.

For example, as illustrated in section (a) of FIG. 6, the display mode selection screen P1 may be displayed on the external display screen E2. In this example, a background screen E21, such as wallpaper, is preferably displayed on the external display screen E2. Here, when the mirror display mode is selected on the display mode selection screen P1, as illustrated in section (b) of FIG. 6, "A" is displayed on each of the main display screen E1 and the external display screen E2.

In the various embodiments described above, an LCD device is described as an example of the external display device 10. The various embodiments, however, are not limited to LCD devices. For example, the external display device 10 may be projector. In this case, the external display screen E2 may be a screen or other suitable display surface for a projector.

According to the above-described embodiments, in response to the connection detection section detecting a connection of the external display device, the display mode setting control unit can temporarily stop/pause a multi-monitor display control process displaying content on a main display screen. Further, the external display screen can output a display of a display mode selection screen for selecting a display mode of a multi-monitor display control process and, in response to a display mode being selected, a multi-monitor display control process associated with the selected display mode is executed so that a content of the main display screen is not immediately displayed on the external display screen in accordance with a display mode that has been set when the external display device is connected. In this manner, it can be ensured that display of content intended by a user can be output to the external display screen of the external display device connected to the electronic device.

The foregoing description has been directed to the embodiment(s) illustrated in the drawings. The present technology, however, is not limited to the illustrated embodiment(s), and may, of course, employ any known configuration as long as advantages of the embodiment(s) can be obtained.

What is claimed is:

1. An apparatus, comprising:
   a processor of an information handling device; and
   a memory that stores code executable by the processor to:
   detect a trigger event associated with an initial use of a first display device, and
   in response to detecting the trigger event:
   temporarily stopping display of content on the first display device,
   display the content on a second display device of a computing device storing the content, and
   place a predetermined interval of time between displaying the content on the second display device and displaying the content on the first display device,
   wherein the first display device is external to the second display.

2. The apparatus of claim 1, further comprising:
   the second display device,
   wherein the code is further executable by the processor to display the content on the second display device prior to detecting the trigger event.

3. The apparatus of claim 1, wherein the first display device is a computer monitor that is one of wirelessly connected, wire connected, and wirelessly and wire connected to the computing device.

4. The apparatus of claim 1, wherein the first display device is a projector connected to the computing device.

5. The apparatus of claim 1,
   wherein temporarily stopping display of the content on the first display device comprises stopping display of the content on the first display device for the predetermined interval of time.

6. The apparatus of claim 1, further comprising:
   the computing device, wherein:
   the computing device comprises the processor and the memory, and
   the trigger event is a connection of the computing device and the first display.

7. The apparatus of claim 6, wherein the connection is one of a wireless connection, a wired connection, and a wired and wireless connection.

8. The apparatus of claim 1, wherein the code is further executable by the processor to:
   display, on the second display device, a selection screen including a plurality of modes for displaying the content;
   receive a mode selection from a user; and
   display the content in the selected mode on at least one of the first display device and the second display device.

9. The apparatus of claim 8, wherein the plurality of modes comprises at least two of:
   a display mode that displays the content on the second display device;
   a mirror display mode that displays the content on the first display device and the second display device;
   an extended display mode that displays the content on a sub-display of the second display device; and
   an external display mode that displays the content on the first display device.

10. The apparatus of claim 9, wherein the trigger event is receiving the mirror display mode as the mode selection.

11. The apparatus of claim 9, wherein the code is further executable by the processor to place the predetermined interval of time between displaying the content on the second display device and displaying the content on the first display device in response to receiving the mirror display mode as the mode selection.

12. The apparatus of claim 9, wherein:
   the trigger event is receiving the mirror display mode as the mode selection;
   the code is further executable by the processor to place the predetermined interval of time between displaying the content on the first display device and displaying the content on the second display device in the mirror display mode; and
   temporarily stopping display of the content on the first display device comprises stopping display of the content on the first display device for the predetermined interval of time.

13. A method, comprising:
  detecting, by use of a processor, a trigger event associated with an initial use of a first display device; and
  in response to detecting the trigger event:
    temporarily stopping display of content on the first display device,
    displaying the content on a second display device of a computing device storing the content, and
    placing a predetermined interval of time between displaying the content on the second display device and displaying the content on the first display device,
  wherein the first display device is external to the second display device.

14. The method of claim 13,
  wherein temporarily stopping display of the content on the first display device comprises stopping display of the content on the first display device for the predetermined interval of time.

15. The method of claim 13, further comprising:
  displaying, on the second display device, a selection screen including a plurality of modes for displaying the content;
  receiving a mode selection from a user; and
  displaying the content in the selected mode,
  wherein the plurality of modes comprises at least two of:
    a display mode that displays the content on the second display device,
    a mirror display mode that displays the content on the first display device and the second display device,
    an extended display mode that displays the content on a sub-display of the second display device, and
    an external display mode that displays the content on the first display device.

16. The method of claim 15, wherein:
  the trigger event comprises receiving the mirror display mode as the mode selection;
  placing the predetermined interval of time between displaying the content on the second display device and displaying the content on the first display device comprises placing the predetermined interval of time in the mirror display mode; and
  temporarily stopping display of the content on the first display device comprises stopping display of the content on the first display device for the predetermined interval of time.

17. A program product comprising a computer-readable storage medium that stores code executable by a processor, the executable code comprising code to perform:
  detecting a trigger event associated with an initial use of a first display device; and
  in response to detecting the trigger event:
    temporarily stopping display of content on the first display device,
    displaying the content on a second display device of a computing device storing the content, and
    placing a predetermined interval of time between displaying the content on the second display device and displaying the content on the first display device,
  wherein the first display device is external to the second display device.

18. The program product of claim 17,
  wherein temporarily stopping display of the content on the first display device comprises stopping display of the content on the first display device for the predetermined interval of time.

19. The program product of claim 17, wherein the executable code further comprises code to perform:
  displaying, on the second display device, a selection screen including a plurality of modes for displaying the content;
  receiving a mode selection from a user; and
  displaying the content in the selected mode,
  wherein the plurality of modes comprises at least two of:
    a display mode that displays the content on the second display device,
    a mirror display mode that displays the content on the first display device and the second display device,
    an extended display mode that displays the content on a sub-display of the second display device, and
    an external display mode that displays the content on the first display device.

20. The program product of claim 19, wherein:
  the trigger event comprises receiving the mirror display mode as the mode selection;
  placing the predetermined interval of time between displaying the content on the second display device and displaying the content on the first display device comprises placing the predetermined interval of time in the mirror display mode; and
  temporarily stopping display of the content on the first display device comprises stopping display of the content on the first display device for the predetermined interval of time.

* * * * *